United States Patent [19]
Stieb et al.

[11] Patent Number: 5,311,613
[45] Date of Patent: May 10, 1994

[54] ATTENUATOR FOR INTEGRATION INTO OPTICAL TRANSMISSION SYSTEMS AND METHODS FOR FABRICATION AND USE THEREOF

[75] Inventors: Werner Stieb; Johann Schulte, both of Stadthagen, Fed. Rep. of Germany

[73] Assignee: Kabelmetal Electro GmbH, Pforzheim, Fed. Rep. of Germany

[21] Appl. No.: 891,275

[22] Filed: May 29, 1992

[30] Foreign Application Priority Data

Jun. 8, 1991 [DE] Fed. Rep. of Germany ....... 4119015

[51] Int. Cl.$^5$ ............................................. G02B 6/26
[52] U.S. Cl. ..................................... 385/140; 385/96; 385/31; 385/39
[58] Field of Search ............... 385/140, 96, 23, 31, 385/39, 41, 20, 21, 22, 44, 45, 43

[56] References Cited

U.S. PATENT DOCUMENTS

| | | | |
|---|---|---|---|
| 4,687,284 | 8/1987 | Rawson et al. | 385/43 |
| 4,740,050 | 4/1988 | Husain | 385/140 X |
| 5,005,936 | 4/1991 | Hsu | 385/24 X |
| 5,146,521 | 9/1992 | Hartog | 385/31 X |

FOREIGN PATENT DOCUMENTS 1428971 10/1988 European Pat. Off. ............ 385/140

*Primary Examiner*—John D. Lee
*Assistant Examiner*—Phan Thi Heartney
*Attorney, Agent, or Firm*—Ware, Fressola, Van Der Sluys & Adolphson

[57] ABSTRACT

An optical attenuation device is described, for example for integration into optical transmission systems wherein the attenuation device is a fusion coupler (4) with an inlet (4a) and an outlet (4b), as well as at least one other inlet or outlet (4c, 4d), and the at least other inlet or outlet (4c, 4d) is closed off reflection-free (6).

12 Claims, 1 Drawing Sheet

ATTENUATOR FOR INTEGRATION INTO OPTICAL TRANSMISSION SYSTEMS AND METHODS FOR FABRICATION AND USE THEREOF

TECHNICAL FIELD

The invention concerns an attenuation device for integration into optical transmission systems, and methods for fabrication and use thereof.

BACKGROUND OF THE INVENTION

Two output characteristics are usually described for an optical transmission system: the transmission rate, e.g. in Mbit/s as a measure of the amount of transmitted data, and the system range, which indicates the maximum attenuation that may be placed between emitter and receiver, if a certain quality of transmission is to be ensured.

However, further information is needed for practical use. A receiver is only able to function optimally within a certain range of the optical input level. Too low a radiation capacity, as well as too high a level, can impair the transmission quality. The path attenuation in optical transmission systems is a function of fiber length and the fiber attenuation coefficient. In addition, emitter output and receiver sensitivity have tolerances and may exhibit aging. For these reasons, a component for adapting the path attenuation to the receiver's optimum function range is needed. So-called attenuation devices are used for this purpose.

An attenuation adapter is known for the above named purpose, and is inserted as a plug or as an intermediate connector into the transmission path. This plug connector has a certain attenuation value.

An alternative solution is a variable optical attenuation device, which makes several graduated attenuations possible, and is directly installed on the receiver plate, between the plug connector and the detector.

A requirement of such attenuation devices in single mode fiber transmission systems is that they be designed to have the lowest reflection possible. Direct reflection back to the laser could lead to feedback noise and deteriorate the transmission quality considerably.

Reflections are avoided in an attenuation device configured as a plug connector, by grinding the plug connectors at an angle.

A filter magazine with different neutral filters is installed in the beam inlet of the variable attenuation device, which has been expanded by spherical lenses. Reflection is prevented in this instance by inclining the filter disks at an angle of about 1.5° with respect to the optical axis. These attenuation devices contain mechanically adjusted parts, which can only be made to be unaffected by environmental influences at great expense (NTZ Vol. 39 (1986), booklet 7, page 481–482).

DISCLOSURE OF THE INVENTION

The invention has the task of introducing an attenuation device with considerably smaller reflection or extremely high reflection attenuation. This characteristic must be extremely stable in the presence of environmental influences (for example temperature changes, vibrations).

The task is fulfilled, according to the present invention, by an attenuation device that is a fusion coupler with an inlet and an outlet, as well as at least one other inlet or outlet, and the at least one other inlet or outlet is closed off reflection-free.

In addition to the advantages resulting directly from the present invention, there is another advantage whereby any desired attenuation factor can be produced in very small steps by the coupler's coupling ratio. Graduations of less than 1% can be achieved in this way.

Another advantage of the present invention is that reflection in the coupling area is negligible, because that part of the light power that is no longer required is led to the reflection-free terminated output port in a well-controlled manner. The reflections are lower than the measuring limit. Environmental influences affecting the optical values, such as e.g. temperature changes, polarity changes and humidity, can be effectively controlled in couplers.

The couplers in further accord with the invention are fusion couplers with three or four gates. As is well known, fusion couplers are produced by placing two glass fibers next to each other, heating them to the melting temperature, and drawing them lengthwise.

In still further accord with the present invention, in a 3-gate coupler, only one of the two inlets or outlets is utilized, the second inlet or outlet is closed off reflection-free; in a 4-gate coupler, the second outlet and second inlet are closed off reflection-free.

According further to the present invention, several possibilities exist for reflection-free termination. A reflection-free termination can be achieved by shatter fragmentation. The fragmentation is imbedded in a suitable material with the refractive index of the fiber. Positioning the fiber in narrow loops before the shatter fragmentation provides an additional improvement.

The present invention furthermore concerns a system for transmitting optical signals by means of an optical fiber between an emitter and a receiver. In this transmission system, according to the present invention, the inlet and the outlet of a coupler, which is produced from two fibers, are connected to the optical fiber, and all other inlets and outlets of the coupler are closed off reflection-free.

These and other advantages of the present invention will become more apparent in light of the following detailed description of a best mode embodiment thereof, as illustrated by means of the schematic configuration examples shown in the drawings.

BEST MODE FOR CARRYING OUT THE INVENTION

Figure 1:
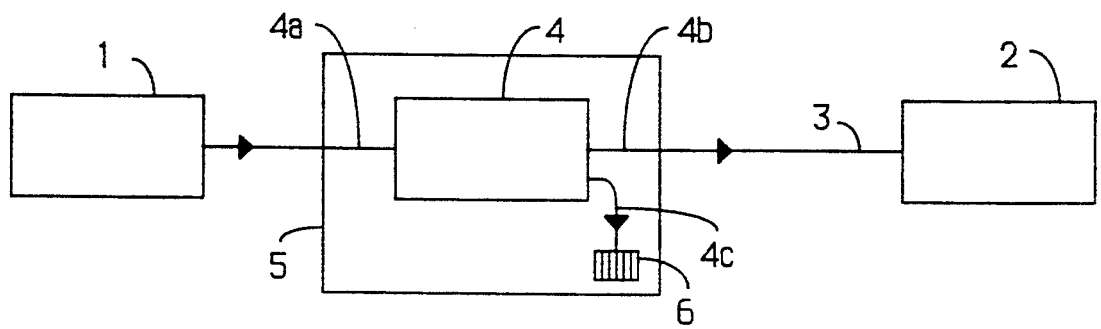
FIG. 1 shows a three-gate coupler, according to the present invention.
Figure 2:
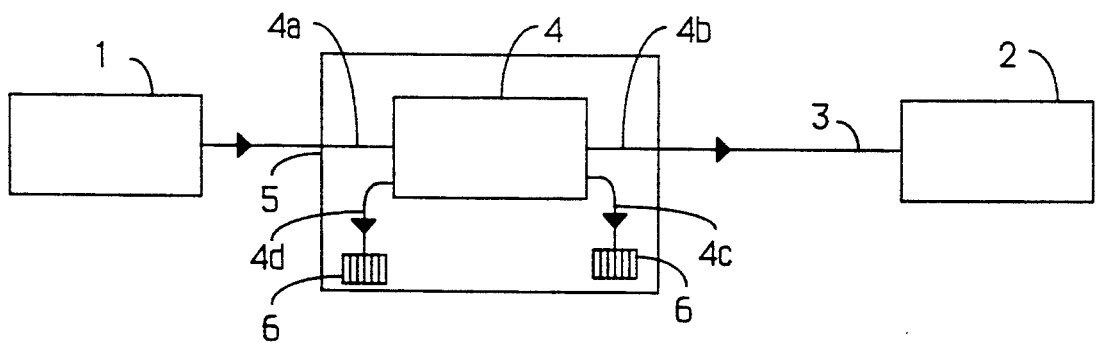
FIG. 2 shows a four-gate coupler, according to the present invention.

In FIGS. 1 and 2, 1 denotes an emitter, for example a laser source, and 2 a receiver. Emitter 1 and receiver 2 are connected with a single mode fiber 3. A coupler 4, located in a housing 5, is inserted into the transmission system consisting of emitter 1, fiber 3 and receiver 2.

The coupler 4 in FIG. 1 is a 3-gate coupler with an inlet 4a and two outlets 4b and 4c. While outlet 4b is connected with receiver 2 by the optical fiber 3, the outlet 4c is closed off reflection-free, as shown at 6.

The coupler in FIG. 2 is a 4-gate coupler, which is connected with the optical fiber 3 through inlet 4a and outlet 4b. In this instance as well, inlet 4d and outlet 4c are closed off reflection-free, as indicated at 6.

Inlet 4a and outlet 4b may be connected to the fiber 3 by means of plug-type connectors. However, it was shown to be more advantageous to splice the fiber by fusion welding.

To produce a reflection-free termination, the fiber of the respective inlet 4d or outlet 4c is wound in a tight coil, secured with a bonding agent, and the fiber end is fractured. The fiber end is then imbedded in a material, whose refractive index is adapted to that of the fiber.

Although the invention has been shown and described with respect to illustrated embodiments thereof, it should be understood by those skilled in the art that the foregoing and various other changes, omissions and additions to the form and detail thereof may be made therein without departing from the spirit and scope of the invention.

We claim:

1. An attenuation device for integration into single mode optical fiber transmission systems, or to be used for single mode optical fiber measurements or sensors, wherein the attenuation device is a 3-gate or a 4-gate fusion coupler with an inlet and an outlet, as well as at least one other inlet or outlet, and the at least one other inlet or outlet is closed off reflection-free.

2. An attenuation device according to claim 1, wherein the coupler is a 3-gate or a 4-gate fusion coupler.

3. An attenuation device according to claim 1, wherein the reflection-free termination is produced by shatter fragmentation.

4. An attenuation device according to claim 3, wherein the shatter fragmentation is imbedded in a material with a selected refractive index.

5. An attenuation device according to claim 3, wherein the shatter fragmentation is located in an area in which a glass fiber, forming the inlet or the outlet of the coupler, is positioned in narrow loops.

6. An attenuation device according to claim 4, wherein the shatter fragmentation is located in an area in which a glass fiber, forming the inlet or the outlet of the coupler, is positioned in narrow loops.

7. An attenuation device according to claim 2, wherein the reflection-free termination is produced by shatter fragmentation.

8. A system for transmitting optical signals between an emitter and a receiver by means of optical fibers, wherein an inlet gate and an outlet gate of a 3-gate or a 4-gate fusion coupler, produced from first and second side-by-side fused glass fibers, wherein ends of the first glass fiber are connected to the optical fibers, and that at least one gate of the second glass fiber is closed off reflection-free.

9. A method of using, in an optical transmission system, a fusion coupler produced by placing first and second optical fibers next to each other, heating them to a melting temperature thereof and drawing them lengthwise, the method comprising the steps of:

using the fusion coupler as an attenuator or attenuation device in the optical transmission system by providing input light into a first end of the first optical fiber of the fusion coupler and receiving output light from a second end of the first optical fiber of the fusion coupler, wherein at least a first or second end of the second optical fiber of the fusion coupler is anti-reflective.

10. The method of claim 9, wherein the at least one other inlet or outlet is coiled.

11. The method of claim 9, wherein the fusion coupler is a three-gate or a four-gate fusion coupler.

12. A method of making an attenuator of an attenuation device for use in an optical transmission system, comprising the steps of:

placing two optical fibers next to each other, eating them to a melting temperature thereof, drawing them lengthwise to form a fusion coupler and closing off at least one inlet or outlet of the fusion coupler reflection-free;

wherein the fusion coupler is a three-gate or a four-gate fusion coupler and wherein the step of closing off comprises the steps of closing off one or two inlets or outlets reflection-free; and wherein the step of closing off is produced by shatter fragmentation.

* * * * *

UNITED STATES PATENT AND TRADEMARK OFFICE
CERTIFICATE OF CORRECTION

PATENT NO. : 5,311,613
DATED : May 10, 1994
INVENTOR(S) : Stieb et al It is certified that error appears in the above-identified patent and that said Letters Patent is hereby corrected as shown below:

At column 4, line 29, please change "of" to --or--; and at line 32, please change "eating" to --heating--.

Signed and Sealed this

Thirtieth Day of August, 1994

*Attest:*

BRUCE LEHMAN

*Attesting Officer*       *Commissioner of Patents and Trademarks*